Jan. 18, 1966   W. W. KOENIG   3,229,836
CEMENT SACK PALLET AND HANDLING EQUIPMENT
Filed Aug. 7, 1964   2 Sheets-Sheet 1
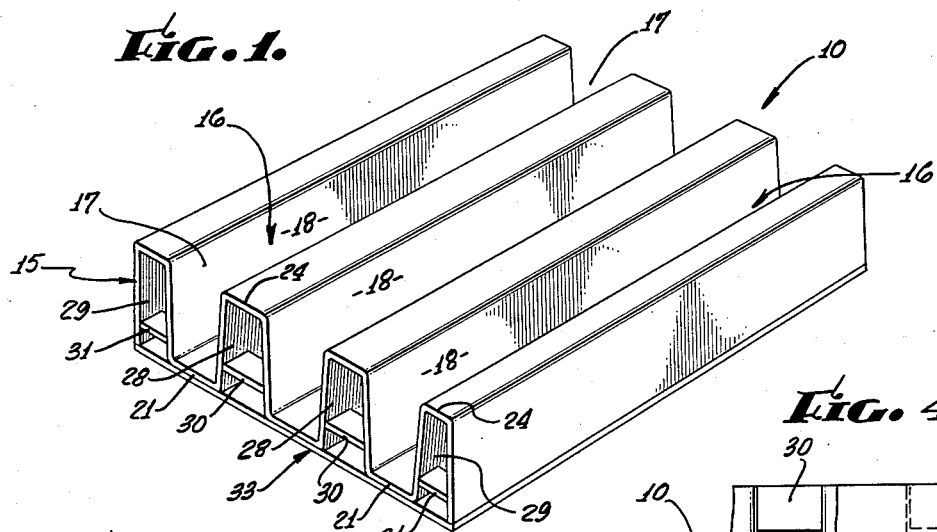
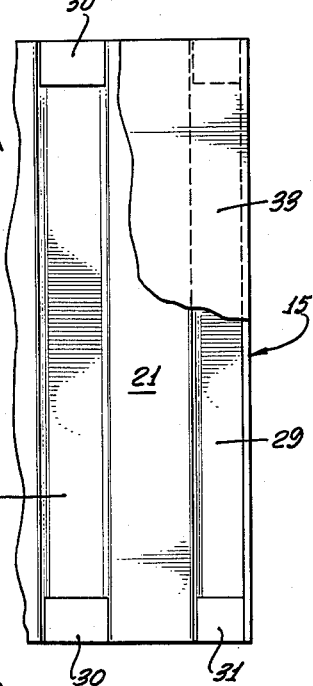
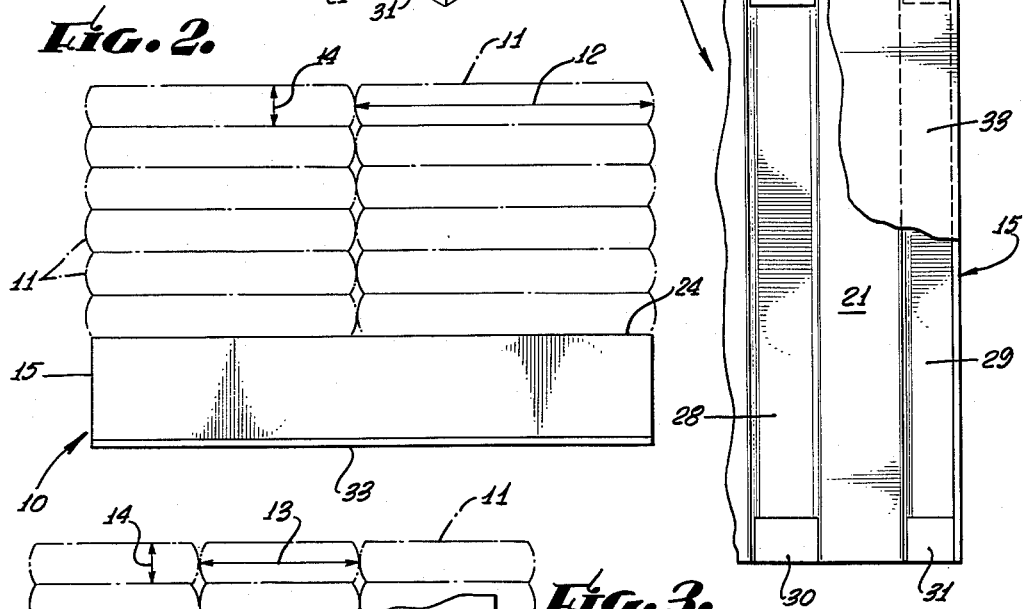
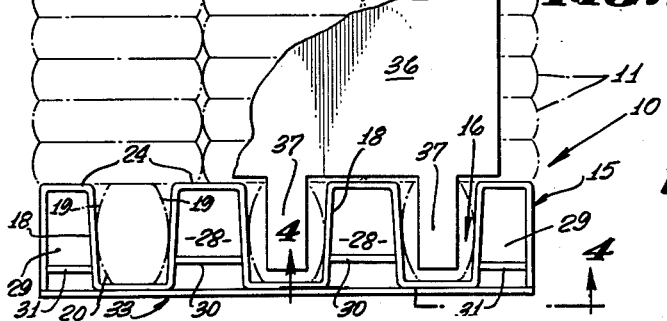
INVENTOR.
WALTER W. KOENIG
BY White & Haefliger
ATTORNEYS.

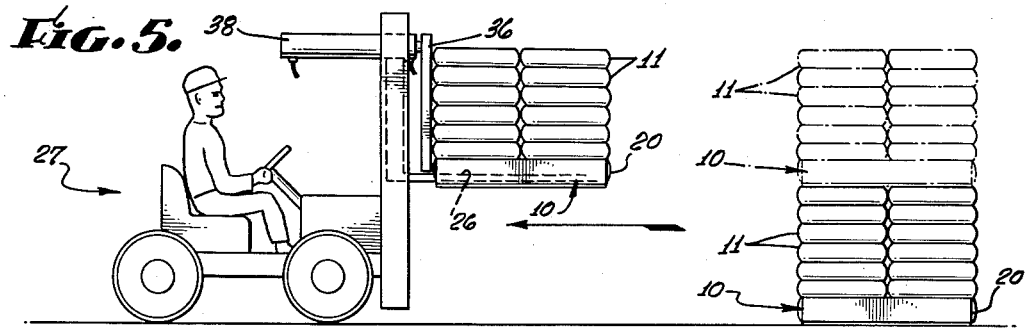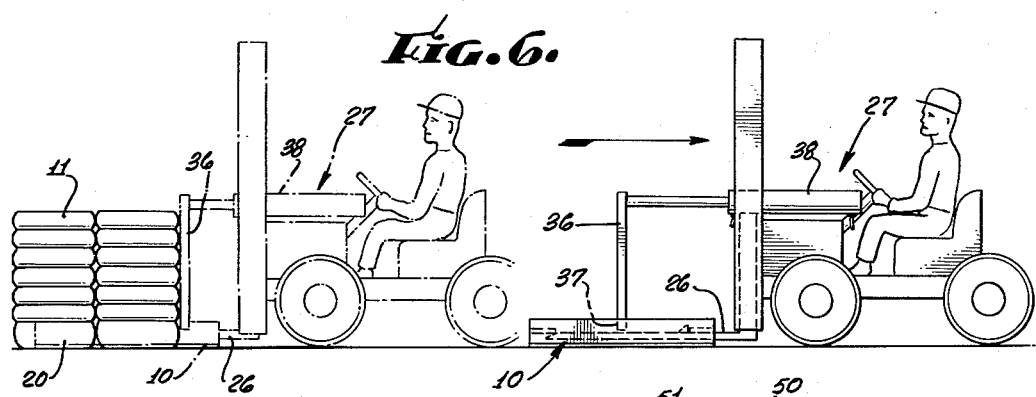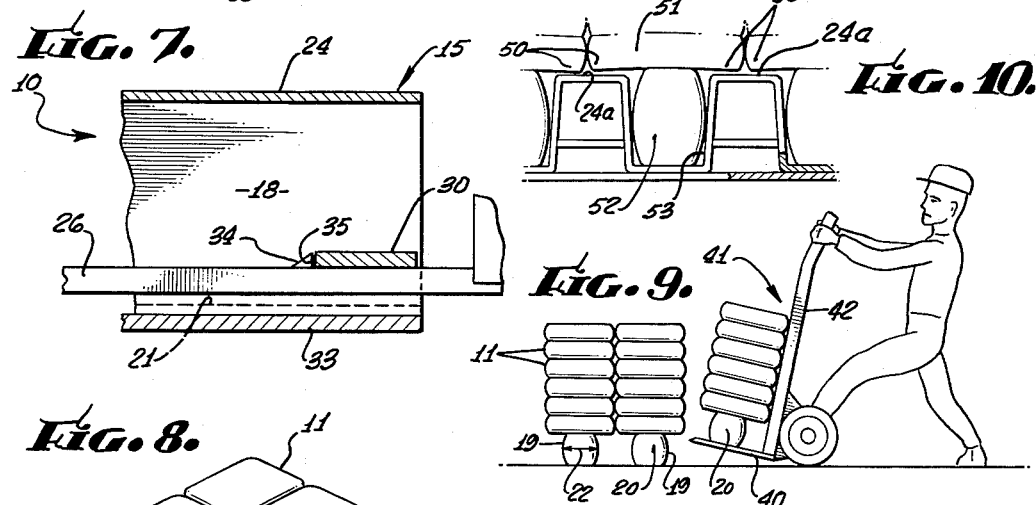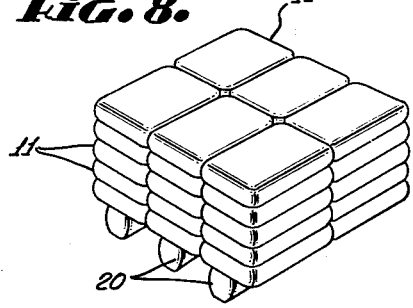

United States Patent Office 3,229,836
Patented Jan. 18, 1966

3,229,836
CEMENT SACK PALLET AND HANDLING EQUIPMENT
Walter K. Koenig, Altadena, Calif., assignor to California Portland Cement Co., Los Angeles, Calif., a corporation of California
Filed Aug. 7, 1964, Ser. No. 388,114
14 Claims. (Cl. 214—310)

This invention relates generally to transportation and stacking of sacks containing flowable solid material, and more particularly concerns an unusually effective pallet structure for efficiently transporting and stacking such sacks.

While the invention broadly concerns pallets for handling of sacks containing flowable solid material generally, it will be described in connection with cement filled sacks with respect to which the pallet structure has a surprisingly high degree of utility. In this regard, prior pallets have, to my knowledge, lacked the ability to carry a so-called "dump" of cement sacks in such manner as to be capable of rapid removal from beneath the sacks without disturbing their organization in the dump, such organization facilitating rapid pickup of sack columns as by a hand truck. These considerations will become clearer after close study of the herein described invention.

It is a major object of the invention to provide a pallet, and also a pallet in combination with flowable solid material filled sacks, which will satisfy the unusual utility requirements and features mentioned above and also discussed later in detail. Basically, the pallet extends horizontally and comprises a relatively stiff corrugated sheet forming multiple laterally spaced and longitudinally horizontally extended recesses opening upwardly along their lengths and having open ends; further, the sheet has walls spaced apart at laterally opposite sides of each recess to confine against spreading apart beyond a predetermined limit the major faces of sacks placed widthwise vertically in the recess, each recess having depth substantially equal to the depth of the material in the sack when confined in the recess, and the mentioned limit typically being greater than the sack nominal thickness dimension; finally, the pallet has plateau regions extending outside the tops of the recesses to underlie additional sacks stacked face down in adjacent columns overlying the plateau regions and recesses to be subsequently supported by sacks previously placed in the recesses and after pallet removal from undersupporting relation to all the sacks. Typically, full and final spreading of the undersupporting sacks takes place only after removal of the pallet and in response to shifting of the load exerted by overlying sacks from the pallet plateau regions to the undersupporting sacks.

Additional objects and unusual advantages of the invention include the provision of tunnels in a pallet of the construction described, the tunnels being formed beneath the plateau regions to receive the tines of a lifting device, together with means in at least one tunnel and carried by the pallet to interlock with a tine shoulder to transmit force acting to relatively displace the pallet longitudinally and horizontally from supporting relation to the sacks; the provision for lifting of the pallet by tines in such manner as to prevent toppling of the sacks stacked thereon; the provision of a pallet as described above including a lower metal sheet extending generally beneath the corrugated sheet in supporting relation therewith, and connected integrally therewith; the provision of an upright sack pusher facing longitudinally toward the zone directly above the pallet and having legs depending into the pallet recesses for applying force horizontally and longitudinally as the pallet is removed from beneath the sacks; the combination of a so-called dump of cement filled sacks with the pallet and pusher structure as described, and the provision for vertical stacking on top of a pallet supported dump of cement filled sacks of a second and like pallet supporting another dump of such sacks.

These and other objects and advantages of the invention, as well as the details of illustrative embodiments, will be more fully understood from the following detailed description of the drawings in which:

FIG. 1 is a perspective showing of one pallet embodying the invention;

FIG. 2 is a side elevation showing the FIG. 1 pallet with broken lines indicating the locations above the pallet of supported cement filled sacks;

FIG. 3 is an end elevation of the FIG. 1 pallet with broken lines showing the locations within and above the pallet of supported cement filled sacks, the meshing of a stack pusher with the pallet also being indicated;

FIG. 4 is a bottom fragmentary view taken on line 4—4 of FIG. 3;

FIG. 5 is an elevational showing of a motorized lifting device handling pallet supported sacks, two dumps of which have been stacked vertically;

FIG. 6 is an elevation which illustrates the manner of removal of the pallet from beneath cement filled sacks;

FIG. 7 is an enlarged fragmentary view illustrating interlocking of a lifting tine with a pallet for purposes of removing a pallet from beneath stacked sacks;

FIG. 8 is a perspective showing of a dump of sacks after pallet removal;

FIG. 9 shows the manner of hand truck handling of stacked sack columns after pallet removal; and FIG. 10 shows a modified pallet construction.

Referring first to FIGS. 1–4, the pallet illustrated at 10 extends generally horizontally for supporting sacks 11 in position for transportation and stacking. The sacks are of the type that contain flowable solid material such as cement, and they have overall length and width dimensions 12 and 13 greater than the sack nominal thickness dimension 14 when the sacks are laid flat and face down. Typical sacks are constructed of heavy paper.

The pallet 10 typically comprises a first relatively stiff corrugated metal sheet 15 forming multiple laterally spaced and longitudinally horizontally extended recesses 16 opening upwardly along their lengths and having open ends 17. Sheet 15 has walls 18 spaced apart at laterally opposite sides of each recess to confine against spreading apart beyond a predetermined limit the major opposite faces 19 of sacks 20 placed widthwise vertically in the recess, downward reception of each sack in a recess being aided by the slight downward taper of walls 18. The bottom terminals of walls 18 are joined by horizontal panels 21 extending in undersupporting relation to sacks 20. Also, each recess 16 has depth substantially equal to the depth of the material in the sack when confined in the recess.

The mentioned predetermined limit is typically greater than the sack nominal thickness dimension 14 to allow for a certain degree of sack spreading in the recess under loading imposed by overlying sacks 11. On the other hand, the limit is less than the dimension between sack faces 19 as measured subsequent to pallet removal as will be described, the latter dimension being designated at 22 in FIG. 9 as illustrative of a fully spread condition of a sack resulting from loading exerted by the column of overlying sacks 11. Among the unusual reasons for confinement of the limit within this range are the tendency for a sack in a recess to initially partly topple if walls 18 are spread wider than the upper limit of said range, whereby the sack cannot later properly support a column of overlying sacks, and also the difficulty of properly and fully inserting a sack in a recess if walls 18 are closer than the lower limit of said range.

Further inspection of FIGS. 1–3 will reval that pallet sheet 15 has plateau regions or lands formed as by horizontal panels 24 and that extend outside the tops of the recesses to underlie and support the opposite end portions of the additional or overlying sacks 11 stacked face down in adjacent columns having mutual contact. Sacks 11 overlie the plateau regions and recesses 16 to be centrally supported by sacks 20 previously placed in the recesses 16 as described above, and particularly after removal of the pallet from undersupporting relation to all the sacks. Typically, the six columns of sacks as seen in FIGS. 2 and 3, and also in FIGS. 5–8 is called a "pallet dump," since they can be transported as a unit on a pallet, as by the four tines 26 of a fork lift vehicle 27, the tines being at the same horizontal level.

The pallet 10 furthermore has tunnels typically formed by sheet 15 beneath the plateau regions or panels 24 to receive the tines 26, the wider and closer together tunnels 28 for example receiving said tines, although narrower tunnels 29 at extreme transverse limits of the pallet may also serve this function. The tunnels typically have means therein and carried by the pallet to interlock with a shoulder on at least one time to transmit force acting to relatively displace the pallet longitudinally and horizontally from supporting relation to the sacks. One such means is seen to extend at 30 in tunnels 28, and at 31 in tunnels 29, in the form of horizontal metal plates spaced above the bottom levels of the recesses 16. Also, plates 30 and 31 are spaced above a flat pallet sheet 33 extending horizontally beneath pallet sheet 15 and connected integrally therewith. Accordingly, tines 26 are typically receivable in the lower portions of the tunnels 28 or 29 below and inwardly beyond the plates, as for example is seen in FIG. 7. Then, when the inserted tines are lifted a bit the upper lugs 34 thereon are engageable with the inner edge 35 of the plates to keep the pallet connected on the tines during sack removal off the pallet. Plates 31 are slightly lower than plates 30, so that they will be engaged by the outermost tines prior to tine engagement of plates 30. As a result, the columns of sacks above the furthest separated corrugations are elevated and tilted inward slightly to press against the more central column or columns of sacks, and preventing toppling thereof.

Such sack removal is typically carried out by operating an upright sack pusher 36 facing longitudinally toward the zone directly above the pallet and having legs 37 depending into recesses 16 for applying force horizontally and longitudinally as the pallet is removed from beneath the stacks. See in this regard FIG. 6 wherein the vehicle 27 is shown as movable rightwardly from broken to full line position in order to relatively withdraw the pallet from beneath the dump of sacks, the pusher 36 being actuated at 38 to prevent rightward displacement of the sacks with the pallet.

FIG. 5 illustrates the transportation and vertical stacking of two pallet supported sack dumps, and it will be observed that each pallet 10 is peripherally slightly smaller than the overall peripheral boundary of the sacks supported thereby, in order that sack dumps may be stacked edge to edge. Also, vertical stacking of an upper pallet on a lower sack dump is facilitated by flat engagement of pallet plate 33 downwardly on the lower sack dump. FIG. 9 illustrates the ease of hand truck pick up removal of a column of sacks 11 supported on a sack 20, the combination having been formed on and by use of a pallet as described. In this regard, lower shelf 40 of hand truck 41 reaches beneath sack 20, and sacks 11 may be tipped to bear against hand truck upright 42. The truck supported column of sacks may be typically called a "hand truck dump."

In FIG. 10 the plateau regions or lands 24a are spaced slightly lower than the sack portions 50 overlying them, the horizontal sacks 51 thus being entirely supported by the vertical sacks 52 in the recesses 53, reducing the frictional loading on the lands during pull-out removal of the pallet from the stack of sacks.

I claim:

1. A generally horizontally extended pallet for supporting sacks in position for transportation and stacking, the sacks each containing flowable solid material and having overall length and width dimensions greater than the sack nominal thickness dimensions when laid flat and face down, comprising a relatively stiff corrugated sheet forming multiple laterally spaced and longitudinally horizontally extended recesses opening upwardly along their lengths and having open ends, the sheet having walls spaced apart at laterally opposite sides of each recess to confine against spreading apart beyond a predetermined limit the major faces of sacks placed widthwise vertically in the recess, each recess having depth substantially equal to the depth of the material in the sack when confined in the recess, the pallet having plateau regions extending outside the tops of the recesses to underlie additional sacks stacked face down in adjacent columns overlying the plateau regions and recesses to be subsequently supported by sacks previously placed in said recesses and after pallet removal from undersupporting relation to all the sacks, said limit being greater than said sack nominal thickness dimension the pallet having tunnels formed beneath said plateau regions to receive tines of a lifting device, and members having shoulders facing downwardly within tunnel interiors and spaced below said plateau regions to receive lifting force exerted by said tines and transmitted to the pallet corrugated metal sheet tending to elevate the corrugations furthest apart to greater extent than sheet corrugation exent therebetween.

2. A generally horizontally extended pallet for supporting comminuted cement filled sacks in position for transportation and stacking, the sacks each having overall length and with dimensions greater than the sack nominal thickness dimensions when laid flat and face down, comprising a relatively stiff corrugated metal sheet forming multiple laterally spaced longitudinally horizontally extended recesses opening upwardly along their lengths and having open ends, the sheet having walls spaced apart at laterally opposite sides of each recess to confine against spreading apart beyond a predetermined limit the major faces of sacks placed widthwise vertically in the recess, the depth of each recess being substantially equal to the depth of the cement in the sack when confined in the recess, the pallet having plateau regions extending outside the tops of the recesses to underlie additional sacks stacked face down and in adjacent columns overlying the plateau regions and recesses to be subsequently supported by sacks previously placed in said recesses and after pallet removal from undersupporting relation to all the sacks, said limit being greater than said sack nominal thickness dimension the pallet having tunnels formed beneath said plateau regions to receive tines of a lifting device, and members having shoulders facing downwardly within tunnel interiors and spaced below said plateau regions to receive lifting force exerted by said tines and transmitted to the pallet corrugated metal sheet tending to elevate the corrugations furthest apart to greater extent than sheet corrugation extent therebetween.

3. A pallet as defined in claim 2 in which said limit is less than the dimension between the sack faces which were confined between said recess walls and as measured subsequent to said pallet removal and after full spreading of said faces resulting from loading exerted by the sack columns.

4. A pallet as defined in claim 2 having tunnels formed beneath said plateau regions to receive the tines of a lifting device, and means in at least one tunnel and carried by the pallet to interlock with a shoulder on at least one tine to transmit force acting to relatively displace the pallet longitudinally and horizontally from supporting relation to the sacks.

5. A pallet as defined in claim 2 including a lower metal sheet extending generally beneath said corrugated sheet and connected integrally therewith.

6. In combination, a generally horizontally extended pallet and sacks supported thereby in position for transportation, the sacks each containing flowable solid material and having overall length and width dimensions greater than the sack nominal thickness when laid flat and face down, the pallet comprising a relatively stiff corrugated sheet forming multiple laterally spaced and longitudinally horizontally extended recesses opening upwardly along their lengths and having open ends, the sheet having walls spaced apart at laterally opposite sides of each recess to confine against spreading apart beyond a predetermined limit the major faces of sacks placed widthwise vertically in the recess, each recess having depth substantially equal to the depth of the material in the sack when confined in the recess, the pallet having plateau regions extending outside the tops of the recesses to underlie additional sacks stacked face down in adjacent columns overlying the plateau regions and recesses to be subsequently supported by sacks previously placed in said recesses and after pallet removal from undersupporting relation to all the sacks, said limit being greater than said sack nominal thickness dimension the lowermost of each of said additional sacks bridging a recess and having supported contact with the plateau regions outside the top of that recess when the pallet is supported on a flat surface.

7. In combination, a generally horizontally extended pallet and comminuted cement filled sacks supported thereby in position for transportation, the sacks each having overall length and width dimensions greater than the sack nominal thickness dimension when laid flat and face down, the pallet comprising a relatively stiff corrugated metal sheet forming multiple laterally spaced and longitudinally horizontally extended recesses opening upwardly along their lengths and having open ends, the sheet having walls spaced apart at laterally opposite sides of each recess to confine against spreading apart beyond a predetermined limit the major faces of sacks placed widthwise vertically in the recess, the depth of each recess being substantially equal to the depth of the cement in the sack when confined in the recess, the pallet having plateau regions extending outside the tops of the recesses to underlie additional sacks stacked face down in adjacent columns overlying the plateau regions and recesses to be subsequently supported by sacks previously placed in said recesses and after pallet removal from undersupporting relation to all the sacks, said limit being greater than said sack nominal thickness dimension the lowermost of each of said additional sacks bridging a recess and having supported contact with the plateau regions outside the top of that recess when the pallet is supported on a flat surface.

8. The combination as defined in claim 7 in which said limit is less than the dimension between the sack faces which were confined between said recess walls and as measured subsequent to said pallet removal and after full spreading of said faces resulting from loading exerted by the sack columns.

9. The combination as defined in claim 7 in which the pallet has tunnels formed beneath said plateau regions to receive the tines of a lifting device, and means in at least one tunnel and carried by the pallet to interlock with a shoulder on at least one tine to transmit force acting to relatively displace the pallet longitudinally and horizontally from supporting relation to the sacks.

10. The combination as defined in claim 7 in which the pallet includes a lower metal sheet extending generally beneath said corrugated sheet and connected integrally therewith.

11. The combination of claim 6 including a second pallet and sack combination of the same construction as defined in claim 6, the second pallet being placed upon the columns of sacks of the claim 6 combination.

12. In combination, a generally horizontally extending pallet for supporting comminuted cement filled sacks in position for transportation and stacking, the sacks each having overall length and width dimensions greater than the sack nominal thickness dimensions when laid flat and face down, comprising a relatively stiff corrugated metal sheet forming multiple laterally spaced and longitudinally horizontally extended recesses opening upwardly along their lengths and having open ends, the sheet having walls spaced apart at laterally opposite sides of each recess to confine against spreading apart beyond a predetermined limit the major faces of sacks placed widthwise vertically in the recess, the depth of each recess being substantially equal to the depth of the cement in the sack when confined in the recess, the pallet having plateau regions extending outside the tops of the recesses to underlie additional sacks stacked face down and in adjacent columns overlying the plateau regions and recesses to be subsequently supported by sacks previously placed in said recesses and after pallet removal from undersupporting relation to all the sacks, said limit being greater than said sack nominal thickness dimension, and an upright sack pusher facing longitudinally toward the zone directly above the pallet and having legs depending into said recesses for applying force horizontally and longitudinally as the pallet is removed from beneath the sacks.

13. In combination, a generally horizontally extended pallet and sacks supported thereby in position for transportation, the sacks each containing flowable solid material and having overall length and width dimensions greater than the sack nominal thickness when laid flat and face down, the pallet comprising a relatively stiff corrugated sheet forming multiple laterally spaced and longitudinally horizontally extended recesses opening upwardly along their lengths and having open ends, the sheet having walls spaced apart at laterally opposite sides of each recess to confine against spreading apart beyond a predetermined limit the major faces of sacks placed widthwise vertically in the recess, each recess having depth substantially equal to the depth of the material in the sack when confined in the recess, the pallet having plateau regions extending outside the tops of the recesses to underlie additional sacks stacked face down in adjacent columns overlying the plateau regions and recesses to be subsequently supported by sacks previously placed in said recesses and after pallet removal from undersupporting relation to all the sacks, said limit being greater than said sack nominal thickness dimension, and an upright sack pusher facing longitudinally toward the columns of sacks above the pallet and having legs depending into said recesses for applying force horizontally and longitudinally as the pallet is removed from beneath the sacks.

14. The combination of claim 13 including means to transmit said force to the pusher and said legs thereof as the pallet is removed from beneath the sacks.

References Cited by the Examiner

UNITED STATES PATENTS

| | | | |
|---|---|---|---|
| 1,922,560 | 8/1933 | Sullivan | 108—52 X |
| 2,256,454 | 9/1941 | Bomar | 214—514 |
| 2,412,184 | 12/1946 | Ulinski | 108—52 |
| 2,544,743 | 3/1951 | Vrabcak | 108—52 |
| 2,702,140 | 2/1955 | Momyer | 214—10.5 X |
| 2,707,573 | 5/1955 | Balwics | 214—514 X |
| 2,906,480 | 9/1959 | Rowe | 108—52 |

GERALD M. FORLENZA, *Primary Examiner.*

A. J. MAKAY, *Assistant Examiner.*